(12) United States Patent
Miyakawa et al.

(10) Patent No.: US 7,050,220 B2
(45) Date of Patent: May 23, 2006

(54) RAMAN GAIN MEASURING METHOD AND APPARATUS

(75) Inventors: Takayuki Miyakawa, Saitama (JP); Yasuyuki Nagao, Saitama (JP)

(73) Assignee: KDDI Corporation, Tokyo (JP)

( * ) Notice: Subject to any disclaimer, the term of this patent is extended or adjusted under 35 U.S.C. 154(b) by 148 days.

(21) Appl. No.: 10/826,631

(22) Filed: Apr. 15, 2004

(65) Prior Publication Data
US 2004/0207909 A1 Oct. 21, 2004

(30) Foreign Application Priority Data
Apr. 17, 2003 (JP) ............... 2003-112563

(51) Int. Cl.
*H01S 3/00* (2006.01)
(52) U.S. Cl. ....................................... 359/334
(58) Field of Classification Search ............... 359/334, 359/337; 356/73.1
See application file for complete search history.

(56) References Cited

U.S. PATENT DOCUMENTS 6,907,157 B1 * 6/2005 Harasawa ..................... 385/24
6,922,532 B1 * 7/2005 Simard et al. ............. 398/177

FOREIGN PATENT DOCUMENTS

| JP | 2002-202224 | 7/2002 |
| JP | 2002-250674 | 9/2002 |
| JP | 2002-296145 | 10/2002 |

* cited by examiner

*Primary Examiner*—Mark Hellner
(74) *Attorney, Agent, or Firm*—Christie, Parker and Hale, LLP (57) ABSTRACT

In a Raman gain measuring method according to the invention, a CW (continuous wave) probe light is input into a Raman amplifying medium. A Raman pumping light being binary-intensity-modulated at a modulation factor is generated. The Raman pumping light is input into the Raman amplifying medium. Two index values regarding to AC component and DC component are extracted from the probe light having propagated through the Raman amplifying medium. The Raman gain of the Raman amplifying medium is determined from the two index values and the modulation factor.

20 Claims, 5 Drawing Sheets

RAMAN GAIN MEASURING METHOD AND APPARATUS

CROSS REFERENCE TO RELATED APPLICATIONS

This application claims priority to Japanese Patent Application No. 2003-112563, filed Apr. 17, 2003, the entire contents of which are incorporated herein by reference.

FIELD OF THE INVENTION

This invention relates to a method and an apparatus to measure gain in a Raman amplifier, namely Raman gain.

BACKGROUND OF THE INVENTION

Raman gain is basically defined by comparing the optical intensity (or optical power) of a signal light when a Raman pumping light exists with the optical intensity (or optical power) of the signal light when a Raman pumping light does not exist. Such measuring methods are described for example in Japanese Laid-Open Patent Application Nos. 2002-296145 (paragraph 0005 and FIG. 2) and 2002-250674.

The Japanese Laid-Open Patent Application No. 2002-296145 further described a method to calculate Raman gain in an optical fiber transmission line in which power variation of a test light in the optical fiber transmission line is measured using OTDR (Optical Time Domain Reflectometry) for both state, one is to apply a Raman pumping light into the optical fiber transmission line and the other is not to apply any Raman pumping light into the optical fiber transmission line, and the Raman gain in the optical fiber transmission line is calculated from the difference of the propagation losses of both cases.

Japanese Laid-Open Patent Application No. 2002-202224 describes conditions for accurately measuring a Raman gain factor.

A conventional method to manually perform ON/OFF operation of a Raman pumping light is time-consuming and troublesome and accordingly incapable of efficiently measuring Raman gain. When an OTDR is used, the whole apparatus becomes very large.

In every conventional method, it is necessary to apply a high power pumping light of 100 mW or more into an optical fiber transmission line for detecting Raman gain with sufficient accuracy. When such a high power pumping light is input, an end surface of an optical fiber in an optical fiber transmission line is sometimes damaged. For instance, if there is dust or flaw on an end surface of an optical fiber, the surface might be destroyed by a high power pumping light.

Furthermore, it is very difficult for all conventional methods to measure Raman gain in a low Raman gain region.

SUMMARY OF THE INVENTION

In a Raman gain measuring method according to the one embodiment of invention, a CW probe light is input into a Raman amplifying medium. A Raman pumping light being binary-intensity-modulated at a modulation factor is generated. The Raman pumping light is input in the Raman amplifying medium. Two index values representing to an AC component and a DC component are extracted from the probe light having propagated through the Raman amplifying medium. The Raman gain of the Raman amplifying medium is determined from the two index values and the modulation factor.

A Raman gain measuring apparatus according to one embodiment of the invention is an apparatus to measure Raman gain in a Raman amplifying medium that comprises a probe light source to generate a probe light composed of a continuous wave laser light and to apply the probe light into the Raman amplifying medium, a pumping light source to generate a pumping light to be binary-intensity-modulated by a modulation factor at a predetermined frequency, a pumping light coupler to apply the pumping light output from the pumping light source into the Raman amplifying medium, an index detector to detect two index values of AC component and DC component from the probe light having propagated through the Raman amplifying medium, and a computing unit to determine Raman gain of the Raman amplifying medium from the two index values detected by the index detector and modulation factor.

BRIEF DESCRIPTION OF THE DRAWINGS

The above and other objects, features and advantages of the present invention will be apparent from the following detailed description of explanatory embodiments of the invention in conjunction with the accompanying drawings, in which.

DETAILED DESCRIPTION

Explanatory embodiments of the invention are explained below in detail with reference to the drawings.

Figure 1:
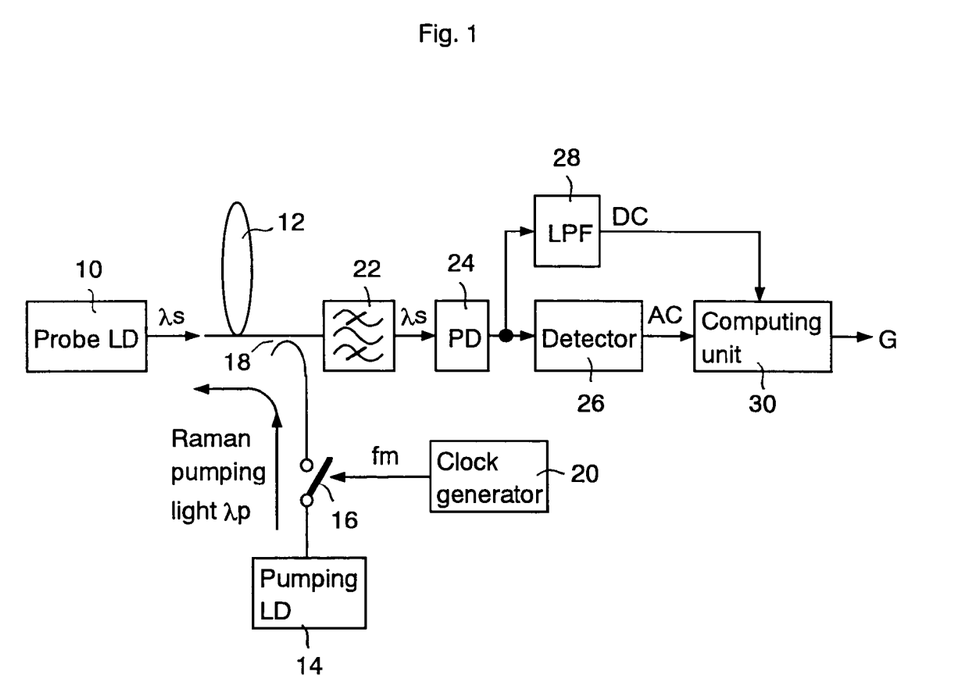
FIG. 1 is a schematic block diagram of a first explanatory embodiment according to the invention.
Figure 2:
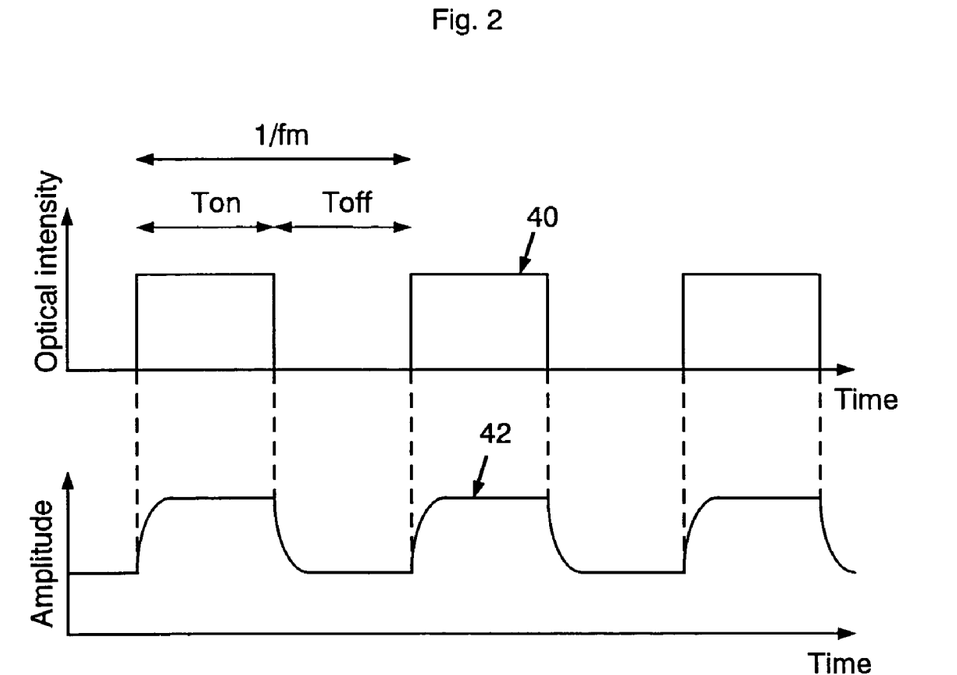
FIG. 2 shows waveform examples of the first explanatory embodiment.

FIG. 1 shows a schematic block diagram of a first explanatory embodiment according to the invention, and FIG. 2 shows waveform examples of an intensity-modulated pumping light and a Raman-amplified probe light in the explanatory embodiment shown in FIG. 1.

A probe laser diode (probe LD) 10 outputs a probe light composed of a continuous wave (CW) laser light of a wavelength λs into an optical fiber transmission line 12. The probe light substitutes for a signal light. The optical fiber transmission line 12, specifically the part on the output side, becomes a distributed Raman amplifying medium.

A pumping laser diode (pumping LD) 14 generates a Raman pumping light of a wavelength λp, which is approximately 100 nm shorter than the wavelength λs of the probe light. The output light from the pumping LD 14 enters the optical fiber transmission line 12 from the back through an optical switch 16 and a wavelength division multiplexing (WDM) optical coupler 18. That is, the probe light and the pumping light propagates in the opposite directions in the optical fiber transmission line 12. The optical fiber transmission line 12 is pumped by the pumping light so as to Raman-amplifying the probe light.

ON/OFF operation of the optical switch 16 is carried out by a clock of a frequency fm generated by a clock generator 20. That is, in this embodiment, the pumping light to pump the optical fiber transmission line 12 is ON/OFF-modulated at the frequency fm.

The probe light having Raman-amplified in the optical fiber transmission line 12 enters a photodetector 24 through an optical bandpass filter 22 of a central wavelength λs. The photodetector 24 generates an electrical signal having amplitude to follow the intensity of the input probe light. The electrical signal from the photodetector 24 enters a detector 26 for detecting an AC component, more specifically the component of frequency fm, and a low-pass filter 28 for detecting a DC component.

The detector 26 detects the AC component in the output from the photodetector 24 using square-law detection. The detector 26 can be a detector which detects the component of frequency fm in the output from the photodetector 24, synchronizing with the clock output from the clock generator 20. The low-pass filter 28 detects the DC component in the output from the photodetector 24.

A computing unit 30 computes an output level of the photodetector 24 when the optical switch 16 is ON-state and an output level of the photodetector 24 when the optical switch 16 is OFF-state and divides the former output level by the latter output level. The former shows optical power of a Raman-amplified probe light when the optical fiber transmission line 12 works as a distributed Raman amplifying medium and the latter shows optical power of an attenuated probe light because of the loss of the optical fiber transmission line 12 when the optical fiber transmission line 12 does not work as a distributed Raman amplifying medium. Accordingly, the quotient obtained from dividing the former by the latter shows the Raman gain G when the optical fiber transmission line 12 operates as a distributed Raman amplifying medium.

The clock generator 20 generates a clock of a duty ratio of 50% and the frequency fm. The ON/OFF state of the optical switch 16 is determined by the output clock from the clock generator 20. For instance, when the output from the clock generator 20 is high (H), the optical switch 16 is turned on, and when the output from the clock generator is low (L), the optical switch 16 is turned off. When the optical switch 16 is ON-state, the output pumping light from the pumping LD 14 is applied to the optical fiber transmission line 12 through the optical switch 16 and the WDM optical coupler 18.

A waveform 40 in FIG. 2 shows a waveform example of a Raman pumping light ON/OFF-controlled through the optical switch 16. A pumping light of the waveform 40 enters the optical fiber transmission line 12 from the back. A waveform 42 shows a waveform example of an output light from the optical bandpass filter 22.

In distributed Raman amplification, it is necessary that the optical fiber transmission line 12 of a Raman amplifying medium is continuously pumped by a pumping light while a probe light to-be-Raman-amplified is propagating in the optical fiber transmission line 12. Accordingly, the period "Ton" to keep the optical switch 16 ON-state should be long enough to meet this condition.

When the probe light starts to propagate in the Raman amplifying medium, the Raman amplifying medium should be filled with the pumping light, and when the probe light is output from the Raman amplifying medium, the pumping light should be in the OFF-state. Accordingly, assuming that velocity of light is C, length of the Raman amplifying medium part to be effectively needed is L, an effective refractive index of the Raman amplifying medium part is n, and the effective refractive indexes n of the wavelength λs and the wavelength λp are equal, the time "Ton" to keep the pumping light ON-state should be 2 nL/c or more. At least, as much time is required in order to measure the loss in the Raman amplifying medium when the pumping light is not applied into the Raman amplifying medium. Therefore, it is satisfactory if the time "Toff" to keep the pumping light OFF-state is set to 2 nL/c or more. However, the following equation should be applied here: Ton+Toff=1/fm.

When the pumping light becomes ON-state, at the beginning, the Raman amplification is only operated on the output part of the optical fiber transmission line 12. Accordingly, the output light from the optical bandpass filter 22 gradually becomes stronger after the pumping light becomes ON-state and then becomes stable at a constant value after a certain time that the Raman amplification is operated in a wide area in the optical fiber transmission line 12. When the pumping light becomes OFF-state, the output light from the optical bandpass filter 22 gradually becomes weaker and when the pumping light does not existing the wide area in the optical fiber transmission lien 12, it becomes stable at the intensity having attenuated as much as the amount of the loss of the optical fiber 12.

Although the embodiment to ON/OFF-modulate the output light from the pumping LD 14 using the optical switch 16 was described, instead of using the optical switch 16, other methods are also applicable. For example, another method is to ON/OFF-modulate the pumping LD 14 with the output clock from the clock generator 20. It is sufficient if pulse driving current is applied to the pumping LD 14.

In the described embodiment, since the Raman amplifying medium is pumped by the ON/OFF-modulated pumping light and the modulating frequency component and DC component of the probe light output from the Raman amplifying medium are detected to determine the Raman gain, noise components except for the modulating frequency component such as a drift component of the probe laser diode 10 are removed. With this operation, measuring accuracy is improved.

Since even small Raman gain can be measured, there is no need to input a high a power pumping light, and thus end surfaces of an optical fiber are no longer damaged.

In the above embodiment, although the pumping light and for Raman amplification is ON/OFF-modulated, the Raman gain can be also measured by intensity-modulating the pumping light with the modulated factor m(0<m·1). This presupposes such conditions that, in a non-saturation region where the pumping light power is small, the gain of the Raman amplification varies according to the following expression in the relation with the optical power P of the Raman pumping light:

$$K \times \exp(K \times P).$$

where X is a constant. In addition, an electric bandpass filter to simply extract a component of frequency fm can be substituted for the detector 26.

Figure 3:
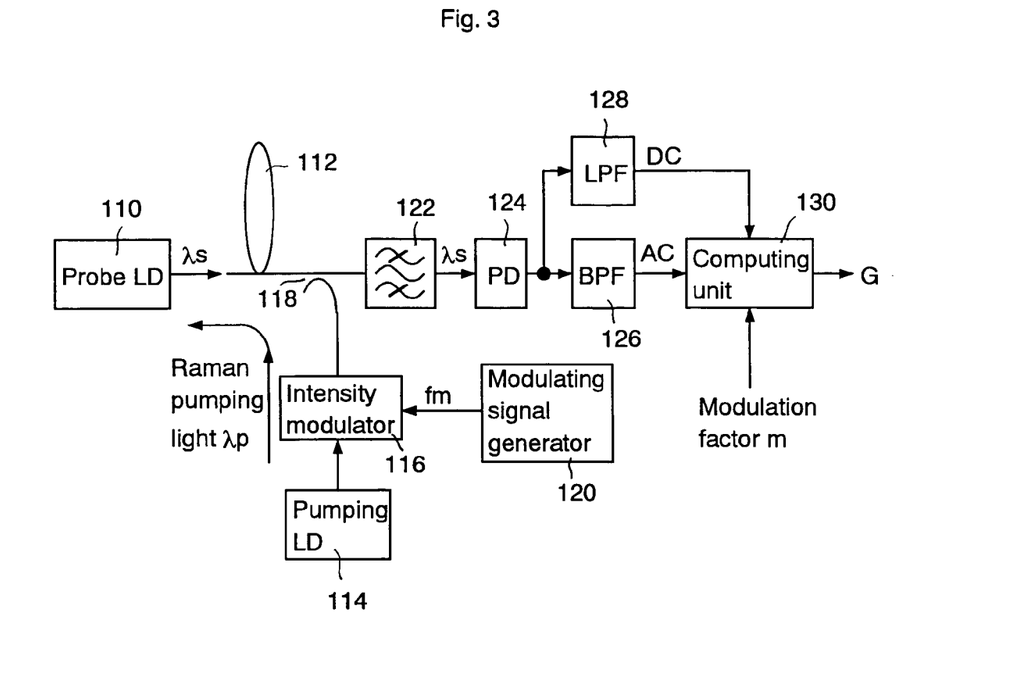
FIG. 3 is a schematic block diagram of a second explanatory embodiment according to the invention.

FIG. 3 shows a schematic block diagram of an explanatory embodiment to binary-modulated intensity of a Raman pumping light by the modulation factor m. The modulation factor m is defined according to the decreasing rate of a low-power pumping light relative to a high-power pumping light and set to a value in a range between no more than 1 and more than 0. When the modulation factor m is 1, similar to the first explanatory embodiment, the Raman pumping light is ON/OFF-modulated and when the modulation factor is 0, the pumping light power is constant.

A probe laser diode (probe LD) 110 applies a probe light composed of a continuous wave (CW) laser light of wavelength λs into an optical fiber transmission line 112. The probe light substitutes for a signal light. The optical fiber transmission line 112, specifically the part on the output side, becomes a distributed Raman amplifying medium.

A pumping laser diode (pumping LD) 114 generates a CW Raman pumping light of wavelength λp, which is approximately 100 nm shorter than the wavelength λs of the porous light. The output light from the pumping LD 114 enters the optical fiber transmission line 112 from the back through an intensity modulator 116 and a wavelength division multiplexing (WDM) optical coupler 118. That is, the probe light and the pumping light propagate in the opposite direction in the optical fiber transmission line 112. The optical fiber transmission line 112 is pumped by the pumping light so as to Raman-amplify the probe light.

The intensity modulator 116 modulates intensity of the output light from the pumping LTD 114 at frequency fm by modulating factor m according to the modulating signal of frequency fm generated by a modulating signal generator 120. The modulating signal generated by the modulating signal generator 120 is composed of a rectangular waveform, of frequency fm. The modulation factor m is larger than 0 and smaller than 1. When the modulation factor m is equal to 1, similar to the first embodiment, ON/OFF modulation is performed.

The probe light Raman-amplified in the optical fiber transmission line 112 transmits through the optical bandpass filter 122 of a central wavelength λs to enter a photodetector 124. The photodetector 124 generates an electrical signal having amplitude according to the intensity of the input probe light. The output electrical signal from the photodetector 124 enters an electric bandpass filter 126 to detect an AC component of the frequency fm and a low-pass filter 128 to detect the DC component.

Figure 4:
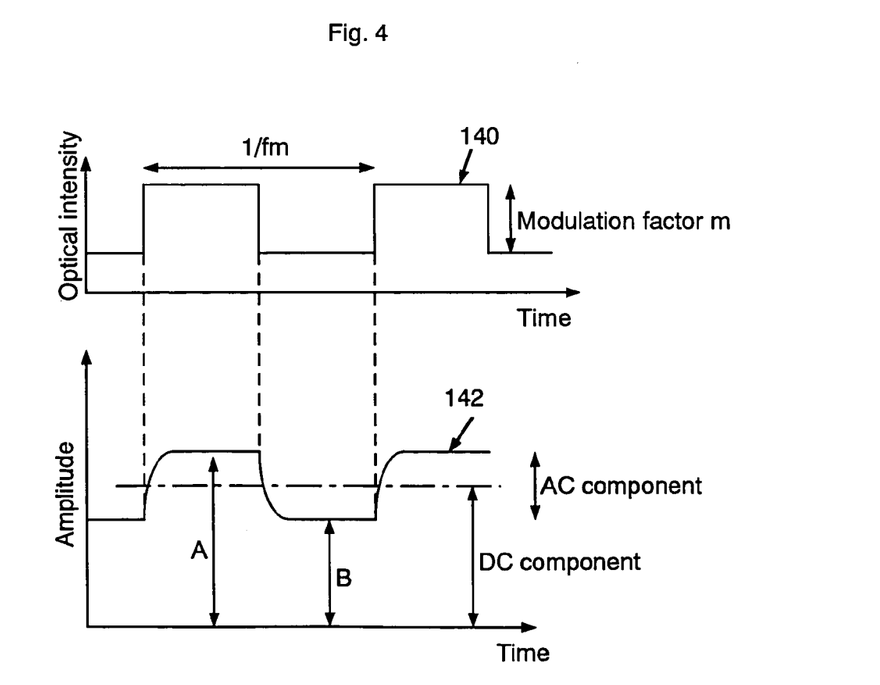
FIG. 4 shows waveform examples of the second explanatory embodiment.

FIG. 4 shows a waveform 140 of an intensity-modulated Raman pumping light and an output waveform 142 from the photodetector 124. The output waveform 142 from the photodetector 124 varies at the frequency fm, which is identical to the frequency used for the intensity modulation of the Raman pumping light. When the amplitude of the output light from the photodetector 124, which corresponds to a high part of the optical intensity of the intensity-modulated Raman pumping light is expressed as A and the amplitude of the output light from the photodetector 124, which corresponds to a low part of the optical intensity of the intensity-modulated Raman pumping light is expressed as B, the Raman gain G is obtained from the following equation:

$$G=\exp(m) \times A/B$$

where, m is the modulation factor of the Raman pumping light as described above.

The amplitude of the output from the LPF 128, i.e. the DC component is expressed as (A+B)/2 and the amplitude of the output from the BPF 126 is expressed as (A−B)/2. When the amplitude of the DC component is expressed as x, and the amplitude of the AC component is expressed as Y, the Raman gain G is obtained from the following equation:

$$G=\exp(m)\,(x+y)/(x-y).$$

A computing unit 130 obtains the amplitude x of the DC component and the amplitude y of the AC component out of the output from the the LPF 128 and BPF 126 to compute the Raman gain G using the above equation. By using the detector 26 instead of the BPF 126, it is possible to directly obtain the amplitude y of the AC component.

In the explanatory embodiments shown in FIGS. 1 and 3, although the intensity of the output from the pumping LD 14, 114 is modulated by the outer modulator 16, 116, is it obvious that the pumping LD 14, 114 can be directly modulated.

In the explanatory embodiments shown in FIGS. 1 and 3, although the AC component and the DC component are separately extracted, it is also applicable that the amplitude (the amplitude A in FIG. 4) of the output from the photodetector 24, 124 that corresponds to the high part of the optical intensity of the intensity-modulated Raman pumping light and the amplitude (the amplitude B in FIG. 4) of the output from the photodetector 24, 124 that corresponds to the low part of the optical intensity of the intensity-modulated Raman pumping light are sampled and measured to determine the Raman gain from the ratio of the measured amplitudes. In addition, the Raman gain G is determined by sampling and measuring the amplitude A or B in FIG. 4, instead of measuring the DC component. That is, the measured values of the amplitudes A and B become two index values regarding to the AC component and DC component of the probe light having propagated in the optical fiber transmission line 12, 112.

Figure 5:
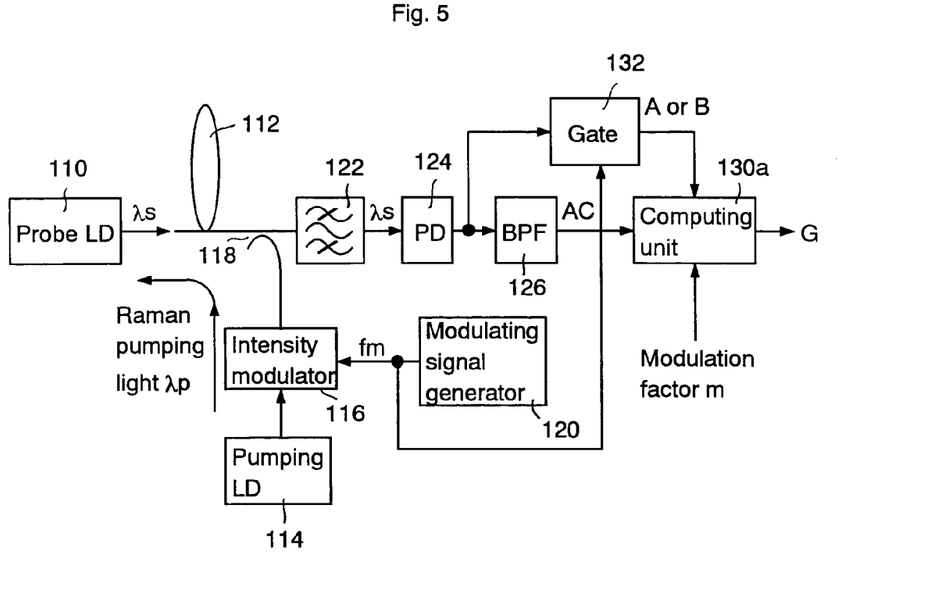
FIG. 5 is a schematic block diagram of a third explanatory embodiment according to the invention.

FIG. 5 shows a modified configuration in which a gate 132 instead of the LPF 128 is disposed to sample the amplitude A (or the amplitude B) according to a modulating signal having a rectangular waveform output from the modulating signal generator 120. In this case, it is preferable that the gate 132 has an average to average sample values on the output stage. A computing unit 130a computes the Raman gain G out of the output from the gate 132, the amplitude of the AC component from the BPF 126, and the modulation factor m.

Figure 6:
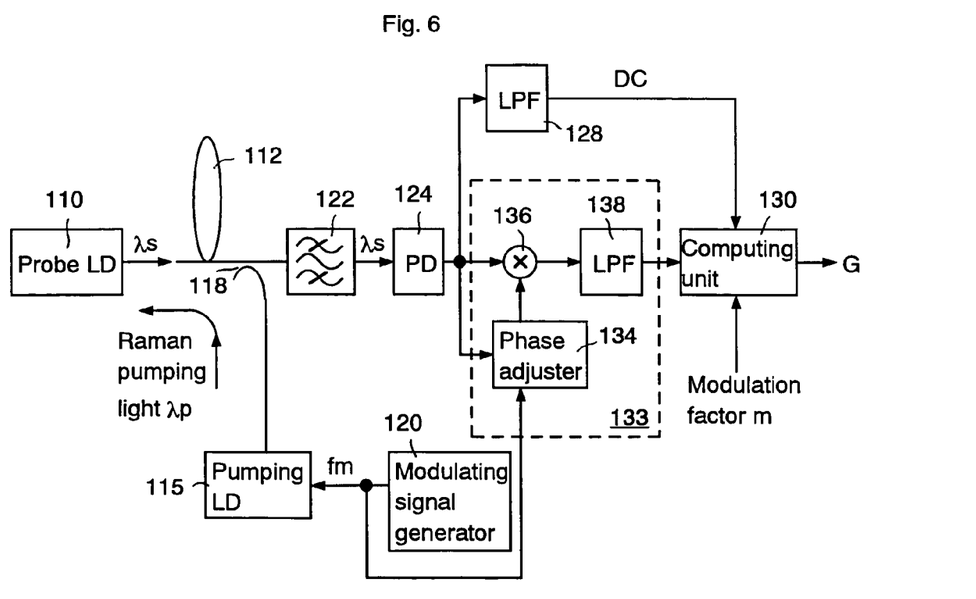
FIG. 6 is a schematic block diagram of a fourth explanatory embodiment according to the invention.

FIG. 6 shows a schematic block diagram of an explanatory embodiment using a detector 133 configured to detect the component of frequency fm in the output from the photodetector 124, synchronizing with a modulating signal having a rectangular waveform output from the modulating signal generator 120. Elements identical to those used in FIG. 3 are labeled with common reference numerals. The modified parts in FIG. 6 are explained below in detail.

A pumping light source 115 generates a Raman pumping light of wavelength λp, intensity-modulated at frequency fm by modulation factor m according to a rectangular modulating signal of frequency fm output from the modulated signal generator 120. The pumping light source 115 is composed of a pumping oil LD and an intensity modulator is intensity-modulate an output light from the pumping LD when an outer modulation is used as shown in FIGS. 1, 3, and 5, and composed of a pumping LD alone when a direct modulation is used.

A phase adjuster 134 adjusts phase of the output from the modulation signal generator 120 as described later and applies the output to a multiplier 136 as a reference signal. The multiplier 136 multiplies the output from the photodetector 124 by the reference signal from the phase adjuster 134. An LPF 138 extracts the DC component out of the output from the multiplier 136 and applies it to the computing unit 130.

The component of frequency fm in the output signal from the photodetector 124 is expressed as $$E \times \sin(\omega t + \alpha)$$

and the reference signal applied from the phase adjuster 134 to the multiplier 136 is expressed as $$F \times \sin(\omega t + \beta)$$

where F is a known quantity.

The output from the multiplier 136 is expressed as:

$$E \times F \times (\cos(\beta - \alpha)/2 - E \times F \times (\cos(2\omega t + \alpha + \beta))/2.$$

The phase adjuster 134 adjusts the phase of the output from the modulating signal generator 120 so as to become $\alpha = \beta$. On this condition, the output from the mutiplier 136 is expressed as:

$$E \times F/2 - E \times F(\cos(2\omega t + 2\alpha))/2.$$

The LPF 138 extracts the DC component, i.e. E×F/2, in the output from the multiplier 136. Since F is a known quantity, it is possible to determine E out of the output from the LPF 138, namely the amplitude of the component of frequency fm included in the output from the photodetector 124.

Although the detector 133 detects a component of frequency identical to the frequency fm used for intensity modulation of the Raman pumping light out of the output from the photodetector 124, it is also applicable to detect a component of frequency obtained by multiplying the modulating frequency fm by an odd number or an integral. By using the method, the Raman gain G also can be measured.

In the above embodiment, although the AC component and DC component or substitute index values for those components are measured after the probe light having propagated in the optical fiber transmission line 12, 112 is converted into an electrical signal, it is also applicable that the probe light having propagated in the optical fiber transmission line 12, 112 is converted into an electrical signal using separate photodetectors to detect the AC component and DC component or the substitute index values for the components from respective electrical signals. That is, it is possible to use two photodetectors.

Figure 7:
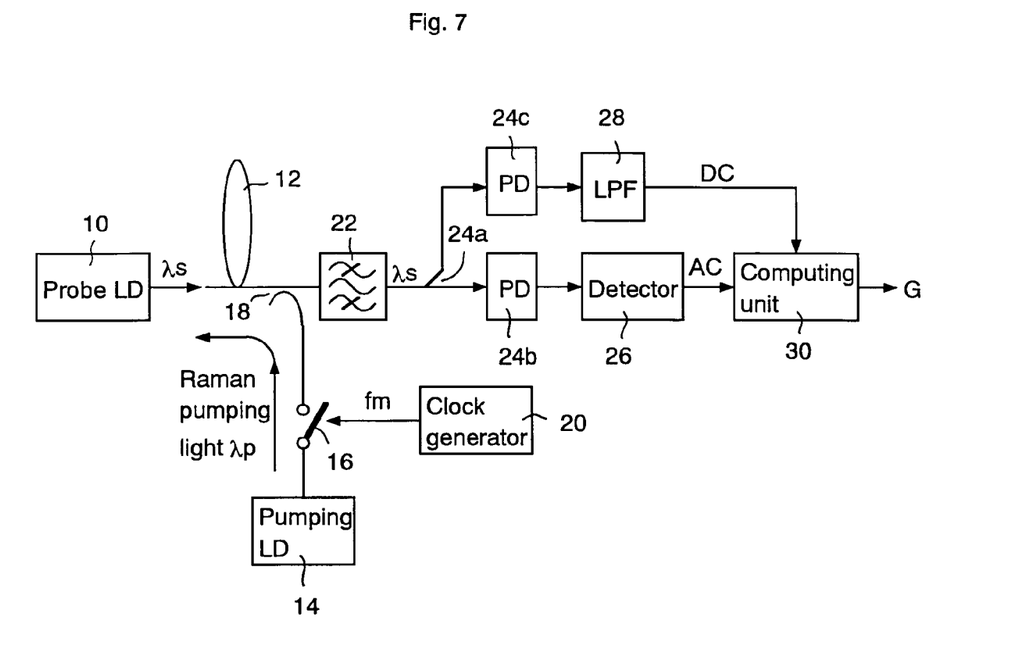
FIG. 7 is a schematic block diagram of a fifth explanatory embodiment according to the invention.

FIG. 7 shows a schematic block diagram of modified parts in a modified explanatory embodiment using two photodetectors. The elements identical to those in FIG. 1 are labeled with common reference numerals.

A splitter 24a splits an output light from the optical bandpass filter 22 into two portions and applies one of the split lights to a photodetector 24b and the other to a photodetector 24c. The photodetector 24b converts the input light into an electrical signal to apply the electrical signal to the detector 26, and the photodetector 24c converts the input light into an electrical signal to apply the electrical signal to the LPF 28. The operations of the detector 26, the LPF 28, and the computing unit 30 are basically the same as these of the embodiment of FIG. 7. In the configuration in FIG. 1, it is necessary to adjust the operations in the computing unit 30 so as to absorb individual differences between the photoelectric converting characteristics in the photodetectors 24b and 24c.

In the explanatory embodiment shown in FIG. 7, although it is required to evaluate the individual difference between the photodetectors 24b and 24c, basically the similar merits described above can be obtained.

The embodiments to measure the amplitude of the modulating frequency fm as an index value regarding to the AC component of the probe light having propagated in the optical fiber transmission line 12, 112 are explained above. However, a component of frequency obtained by multiplying the frequency fm by an integer also can be an index value regarding to the AC component of the probe light having propagated in the optical fiber transmission line 12, 112.

As readily understandable from the aforementioned explanation, according to the invention, Raman gain is immediately measured with high accuracy.

While the invention has been described with reference to the specific embodiment, it will be apparent to those skilled in the art that various changes and modifications can be made to the specific embodiment without departing from the spirit and scope of the invention as defined in the claims.

What is claimed is:

1. A Raman gain measuring method comprising:
   inputting a CW probe light into a Raman amplifying medium;
   generating a modulated Raman pumping light being binary-intensity-modulated by a modulation factor;
   inputting the modulated Raman pumping light into the Raman amplifying medium;
   extracting two index values from an AC component and a DC component of the probe light propagated in the Raman amplifying medium; and
   determining Raman gain of the Raman amplifying medium from the two extracted index values and the modulation factor.

2. The method of claim 1 wherein the step of inputting the Raman pumping light into the Raman amplifying medium comprises inputting the Raman pumping light into the Raman amplifying medium so that the modulated Raman pumping light propagates in an opposite direction of the probe light.

3. The method of claim 1 wherein the step of extracting two index values from the AC component and the DC component of the probe light comprises:
   converting the probe light to an electrical signal using a photodetector; and
   extracting the two index values from the electrical signal.

4. The method of claim 1 wherein the step of extracting two index values comprises:
   converting the probe light to an electrical signal using two photodetectors; and
   extracting the two index values from respective electrical signals output from the two photodetectors.

5. The method of claim 1 wherein the two index values comprise an index value to show the amplitude of the AC component and an index value to show the amplitude of the DC component.

6. The method of claim 1 wherein one of the two index values comprises an index value to show a level of the probe light propagated in the Raman amplifying medium at a fist power level of the binary-intensity-modulated Raman pumping light, or an index value to show a level of the probe light propagated in the Raman amplifying medium at a second power level of the binary-intensity-modulated Raman pumping light.

7. A Raman gain measuring apparatus to measure Raman gain in a Raman amplifying medium comprising:
   a probe light source to generate a probe light composed of a CW laser light and to apply the probe light to the Raman amplifying medium;
   a pumping light source to generate a pumping light to be binary-intensity-modulated by a modulation factor at a predetermined frequency;

a pumping light coupler to apply the pumping light output form the pumping light source into the Raman amplifying medium;

an index detector to detect two index values of an AC component and a DC component from the applied probe light propagated in the Raman amplifying medium; and a computing unit to determine Raman gain of the Raman amplifying medium from the two index values detected by the index detector, and the modulation factor.

8. The apparatus of claim 7 wherein the pumping light source comprises a pumping laser diode to generate a continuous wave laser light and an intensity modulator to binary-modulate the output light from the pumping laser diode by the modulation factor at the predetermined frequency.

9. The apparatus of claim 8 wherein the intensity modulator comprises an optical switch.

10. The apparatus of claim 7 wherein the index detector comprises:

a photodetector to convert the applied probe light into an electrical signal; and an index measuring apparatus to measure two index values the AC component and the DC component from the electrical signal output from the photodetector.

11. The apparatus of claim 10 wherein the index measuring apparatus comprises a detector to detect the predetermined frequency out of the electrical signal from the photodetector.

12. The apparatus of claim 10 wherein the index measuring apparatus comprises an AC detector to detect the AC component of the electrical signal from the photodetector and a DC detector to detect the DC component of the electrical signal from the photodetector.

13. The apparatus of claim 10 wherein the index detector comprises a level detector to detect from the output of the photodetector a level of the probe light at a first power level of the binary-intensity-modulated Raman pumping light or a level of the applied probe light at a second power level of the binary-intensity-modulated Raman pumping light; and a detector to detect one of the AC component and DC component out of the output from the photodetector.

14. The apparatus of claim 8 wherein the index detector comprises:

an optical splitter to split the applied probe light into two portions;

a first photodetector to convert one of the output lights from the optical splitter into an electrical signal;

a second photodetector to convert the other output light from the optical splitter into an electrical signal;

a first index measuring apparatus to measure one of the two index vlaues of the AC component and DC component from the electrical signal from the first photodetector; and a second index measuring apparatus to measure the other of the two index vlaues of the AC component and DC component from the electrical signal from the second photodetector.

15. The apparatus of claim 14 wherein the first index measuring apparatus comprises a detector to detect the predetermined frequency out of the electrical signal from the first photodetector.

16. The apparatus of claim 14 wherein the first index measuring apparatus comprises an AC detector to detect the AC component of the electrical signal from the first photodetector and the second index measuring apparatus comprises a DC detector to detect the DC component of the electrical signal from the second photodetector.

17. The apparatus of claim 14 wherein the first index measuring apparatus comprises a level detector to detect from the output of the first photodetector a level of the applied probe light at a first power level of the binary-intensity-modulated Raman pumping light, or a level of the applied probe light at a second power level of the binary-intensity-modulated Raman pumping light; and the second index measuring apparatus comprises a detector to detect one of the AC component and the DC component from the output of the second photodetector.

18. A method for measuring Raman gain of a Raman amplifying medium, the method comprising:

propagating a CW probe light into the Raman amplifying medium;

propagating a modulated Raman pumping light, modulated by a modulation factor, into the Raman amplifying medium;

extracting a first index value from an AC component of the propagated probe light;

extracting a second index value from a DC component of the propagated probe light; and determining the Raman gain of the Raman amplifying medium according to the first and second extracted index values and the modulation factor.

19. The method of claim 18 wherein the steps of extracting a first index value and a second index index value comprises converting the probe light to a first and a second electrical signal; and extracting the first index value from the first electrical signal and the second index value from the second electrical signal.

20. The method of claim 18 wherein the the first and second index values comprise an index value to show the amplitude of the AC component and an index value to show the amplitude of the DC component.

* * * * *

UNITED STATES PATENT AND TRADEMARK OFFICE
CERTIFICATE OF CORRECTION

PATENT NO. : 7,050,220 B2
APPLICATION NO. : 10/826631
DATED : May 23, 2006
INVENTOR(S) : Miyakawa et al.

It is certified that error appears in the above-identified patent and that said Letters Patent is hereby corrected as shown below:

On the Title Page

| | |
|---|---|
| (56) References Cited U.S. Patent Documents 6,907,157... | Delete "B1", Insert --B2-- |
| (56) References Cited U.S. Patent Documents 6,922,532... | Delete "B1", Insert --B2-- |
| (57) Abstract, lines 6-7 | Delete "to AC component and DC", Insert --an AC component and a DC-- |

In the Claims

| | |
|---|---|
| Column 8, line 53, Claim 6 | Delete "fist", Insert --first-- |
| Column 9, line 52, Claim 14 | Delete "vlaues", Insert --values-- |
| Column 10, line 2, Claim 14 | Delete "vlaues", Insert --values-- |
| Column 10, line 41, Claim 19 | Delete "index index", Insert --index-- |

UNITED STATES PATENT AND TRADEMARK OFFICE
CERTIFICATE OF CORRECTION

PATENT NO. : 7,050,220 B2
APPLICATION NO. : 10/826631
DATED : May 23, 2006
INVENTOR(S) : Miyakawa et al.

It is certified that error appears in the above-identified patent and that said Letters Patent is hereby corrected as shown below:

Column 10, line 48, Claim 20     Delete "the the",
                                 Insert --the--

Signed and Sealed this

Twenty-sixth Day of December, 2006

JON W. DUDAS
*Director of the United States Patent and Trademark Office*